(12) United States Patent
Borkowski

(10) Patent No.: US 6,247,825 B1
(45) Date of Patent: *Jun. 19, 2001

(54) NIGHT VISION LIGHTING SYSTEM FOR USE IN VEHICLES

(76) Inventor: Richard E. Borkowski, 1504 Cliffwood Rd., Euless, TX (US) 76040

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,781

(22) Filed: Oct. 30, 1999

Related U.S. Application Data

(60) Provisional application No. 60/145,453, filed on Jul. 23, 1999.

(51) Int. Cl.$^7$ .............................. F21V 19/00; H01R 33/00
(52) U.S. Cl. .............................. 362/23; 362/28; 362/471; 362/489; 362/545; 362/800; 362/184
(58) Field of Search .................... 362/23, 28, 471, 362/489, 545, 800, 20, 184

(56) References Cited

U.S. PATENT DOCUMENTS

| | | | |
|---|---|---|---|
| 4,580,196 | * 4/1986 | Task | 362/62 |
| 5,086,378 | * 2/1992 | Prince | 362/103 |
| 5,124,892 | * 6/1992 | Lambert | 362/103 |

* cited by examiner

Primary Examiner—Sandra O'Shea
Assistant Examiner—David V. Hobden
(74) Attorney, Agent, or Firm—Jackson Walker LLP

(57) ABSTRACT

A vehicle lighting system providing lighting for an instrument panel generating light having a wave length, such as white light, which does not interfere with night goggle vision systems. The system comprises a portable housing, a battery pack, and an plurality of cables extending outwardly from the housing to a plurality of light-emitting elements providing white light proximate each of the plurality of vehicle instruments.

20 Claims, 5 Drawing Sheets

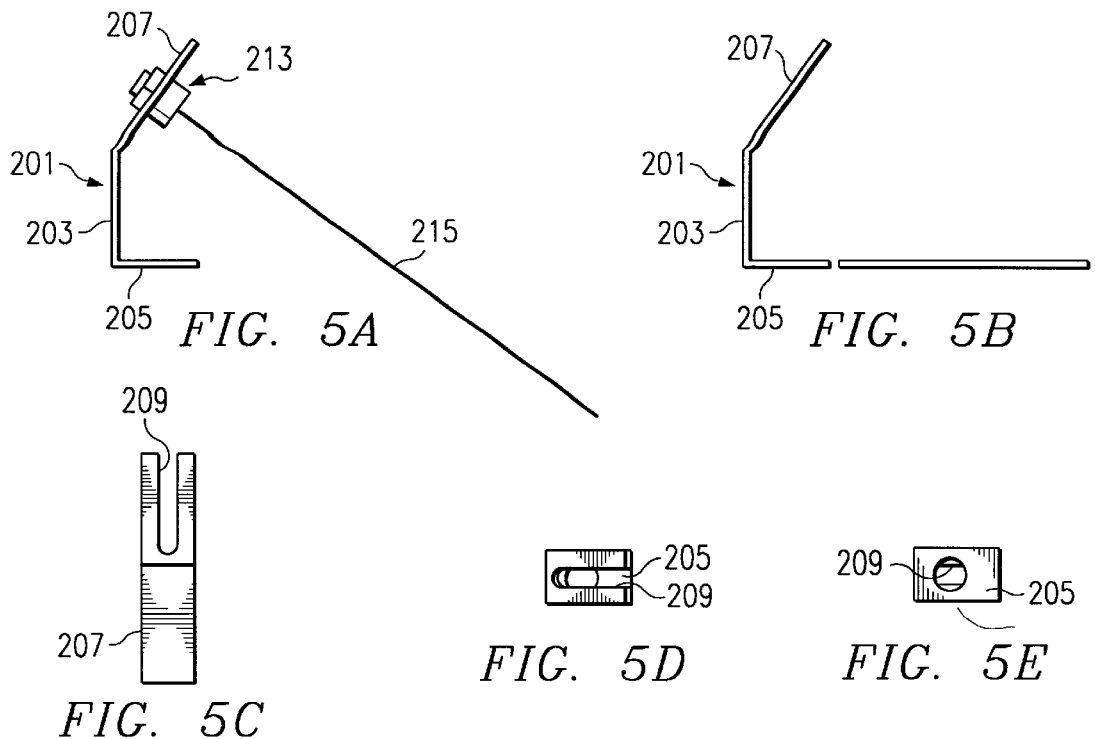
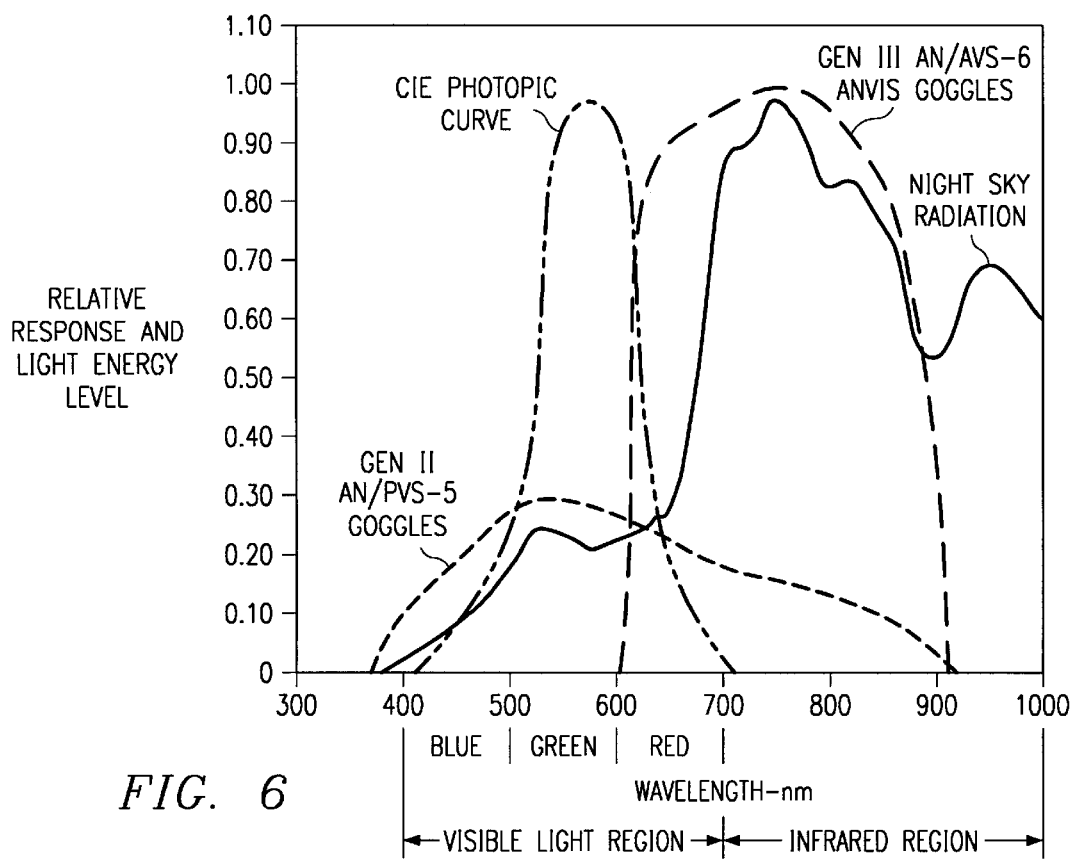

SPECIFICATIONS:
MATERIAL – 6061 T6 ALUMINUM PER FED SPEC QQ-A-200/BF

FINISH – BLACK ANODIZE PER MIL-A-8625, TYPE II, CLASS 2

PERFORMANCE CHARACTERISTICS:
$V_F$ = 3.6 V TYP
       4.0 V MAX
$I_F$ = 20 mA
PEAK $I_F$ = 80 mA
CONT $I_F$ = 25 mA 0.010 THICK BOROFLOAT OVER P 2100 0.040 THICK

NIGHT VISION LIGHTING SYSTEM FOR USE IN VEHICLES

This application claims benefit of provisional application 60/145,453 filed on Jul. 23, 1999.

FIELD OF THE INVENTION

The present invention relates in general to illumination systems for use in vehicles for use with night vision systems.

BACKGROUND OF THE INVENTION

It has now become a common practice for law enforcement, military, and emergency response personnel to utilize night vision imaging systems (NVIS) including night vision goggles (NVG) to conduct night or low-light operations. Currently, night vision imaging systems include either goggles (which are "binocular" or "monocular") which are worn by an operator, and which respond to visible and near-infrared light having wavelengths up to 930 nanometers. As is conventional, the night vision imaging systems typically generate a visible, phosphor-screen image from normally imperceptible radiation.

Typically, night vision imaging system goggles include one or two image intensifier tubes mounted to a head strap or a helmet. The image intensifier is a vacuum tube device similar to a miniature video camera and screen packaged together. Typically, the intensifier includes a photocathode receptor which receives visible light and infrared light energy and converts the visible light and infrared light energy into electrons, a microchannel plate which multiplies the number of electrons emitted by the photocathode (thus serving as an amplifying device), and a green phosphor screen which converts the electrons into a visible image. Currently, there are two types of intensifier tubes which are in widespread usage. The first type is a generation II intensifier tube, which utilizes a multialkali photocathode. The second type is a generation III intensifier tube which utilizes a more sensitive gallium arsenide photocathodes. Generation III intensifier tubes are more costly than generation II photocathode tubes, but have a longer use life.

While night vision imaging systems are very useful in law enforcement, military, and emergency response applications, they are not tolerant of high levels of visible light or infrared radiation. In other words, night vision imaging systems are best when employed in actual low light conditions.

When personnel are within a vehicle, such as, without limitation, aircraft, watercraft, or land-based vehicles, the night vision imaging systems may be useful for night operations; however, it is not uncommon for the interior space of the vehicle to include sources of visible light or infrared radiation which interfere with the operation of the night vision imaging system. High intensity visible light or high intensity infrared radiation, which is within the operating range of the night vision imaging system, impedes the effective utilization of the night vision imaging system, sometimes rendering such devices essentially useless. Consequently, illuminated displays and other sources of light which are necessary for low light operation of communication and control equipment must be neutralized in order to render night vision imaging system useful for low light operations conducted from within a vehicle. While the problem is present in all vehicles, including watercraft and land-based vehicles, it is especially acute for aircraft which are highly-instrumented devices. For example, fixed-wing aircraft or rotor-wing aircraft include a large array of gages, displays, LED devices, and the like, which emit visible light and infrared radiation which does interfere with the utilization of night vision imaging systems, such as night vision goggles.

Accordingly, in order to allow low light operations, a variety of prior art approaches have been developed for dealing with the interfering light sources within the cockpit or interior space of other vehicles such as ships, boats, and land-based vehicles.

The present invention is of generally applicability to all vehicles which may be utilized during low light operations which would benefit from the use of night vision imaging systems, and is not limited to fixed wing and rotor wing aircraft; however, for purposes of exposition only, the specification contained herein will discuss primarily fixed-wing and rotor-wing aircraft. The prior art approaches will now be discussed, with reference to fixed-wing and rotor-wing aircraft.

One approach of the prior art is to replace the dials, gages, light emitting diodes, and illuminated displays within an aircraft with comparable equipment which is illuminated within a wavelength range which would not interfere with the utilization of night vision imaging systems. One significant drawback with this prior art approach is the significant costs associated with such retrofitting operations. The costs are high because regulatory agencies such as the Federal Aviation Administration strictly require documentation of such modifications. An additional reason for the expense is that the replacement instruments have considerable costs associated with them.

A second approach of the prior art is to replace the lighting or illumination source within the instruments. This is also expensive, since it requires that the instruments, gages, and displays be individually removed and modified: Again, considerable costs are associated with the documentation required for such operations, as well as for purchase of the replacement lighting sources.

A third approach of the prior art is to install post, bezel, or flood lighting within the craft cockpit which is an alternative means of lighting the essential displays and gages. One significant advantage is that the post, bezel, or flood lighting systems are supplementary systems which do not replace the existing illumination systems within the craft. During low light operations, the lighting systems of the craft are switched from an "on" condition to an "off" condition (which is referred to as a "blackout"). The supplementary posts, bezel, or flood lighting systems are turned on and used as a sole source of illumination of the various gages, displays, meters, and the like, during the duration of the low light operations. The night vision imaging systems may be then utilized without any interference from the illumination sources associated with the cockpit instrument lighting systems.

When this approach is utilized minor/major changes to the aircraft wiring must be accommodated. This permits power to be directed to the external accessories in lieu of the original instrument.

SUMMARY OF THE INVENTION

It is one objective of the present invention to provide a vehicle lighting system which does not require rewiring of the instrument panel.

It is another objective of the present invention to provide a vehicle lighting system which provides lighting for an instrument panel which is in a wavelength range which does not overlap with the night goggle vision systems.

These and other objectives are achieved as is now described. The present invention is directed to a supplemental lighting system which may be utilized in a vehicle during night vision imaging operations, in order to illuminate a plurality of vehicle instruments. A portable housing is provided. A battery pack is located within the portable housing. A plurality of electrical cables extend outwardly from the portable housing. These electrical cables define a plurality of current paths and electrical communication with the battery pack. A plurality of light-emitting circuit elements (preferably light emitting diodes) are coupled to a plurality of current paths. Each light-emitting circuit element provides a spot light, when energized, which as a wavelength which does not interfere with night vision imaging operations. A plurality of mechanical coupling devices are provided which locate the spot light of each of the plurality of light-emitting circuit elements relative to a particular one of the plurality of vehicle instruments.

BRIEF DESCRIPTION OF THE DRAWINGS

FIGS. 5A through 5E are pictorial representations of a bracket utilized in the preferred embodiment of the lighting system of the present invention;

FIG. 6 is a graphical representation of the frequency relative responses of night vision imaging systems and human vision;

DETAILED DESCRIPTION OF THE PREFERRED EMBODIMENT

Figure 1:
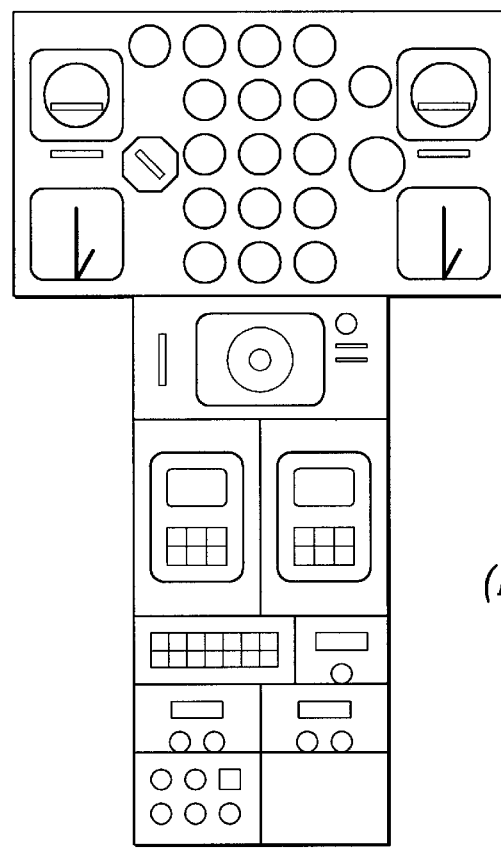
FIG. 1 is a pictorial representation of an exemplary prior art cockpit.

FIG. 1 is a pictorial representation of a cockpit of an aircraft. As is shown, a plurality of conventional lighted gages, dials, meters and instrument panels are provided, all of which are essential for proper flight operations. The lighting systems which are conventional in most cockpits operate in a wavelength range which could potentially interfere with night vision imaging systems. Accordingly, for the flight personnel to utilize night vision imaging systems, the instrument lights and control lights must be powered-off. Otherwise, the infrared associated with standard illumination of the cockpit would become overpowering and make the night vision imaging system useless or ineffective.

An aircraft cockpit contains a number of different lighting systems, such as incandescent lights, active matrix LCDs, LEDs, and CRTs. The present invention is useful for providing alternative lighting for incandescent lighting systems.

Figure 2:
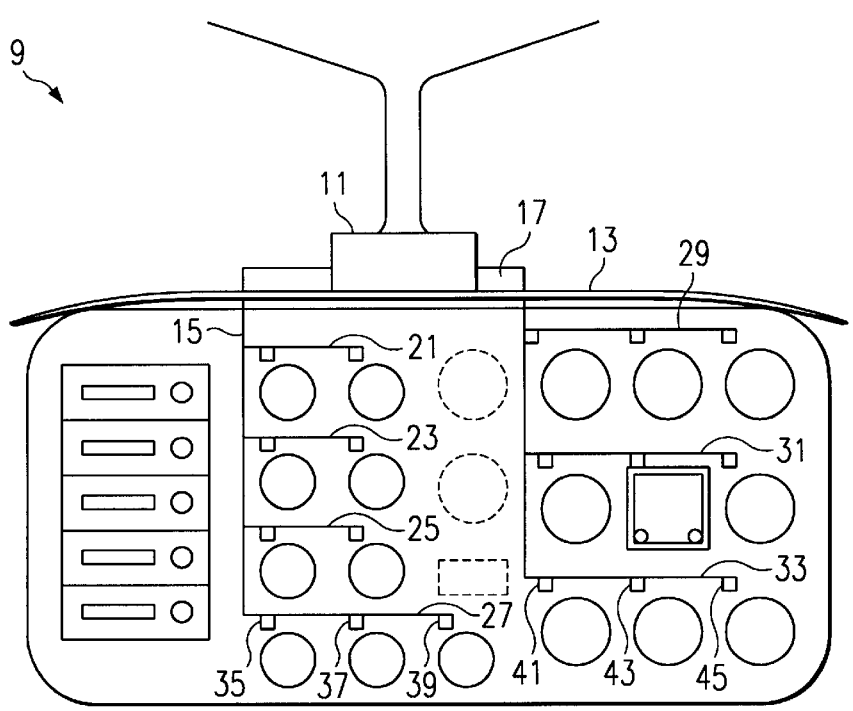
FIG. 2 is a pictorial representation of the lighting system of the present invention implemented in a rotor wing craft.
Figure 3:
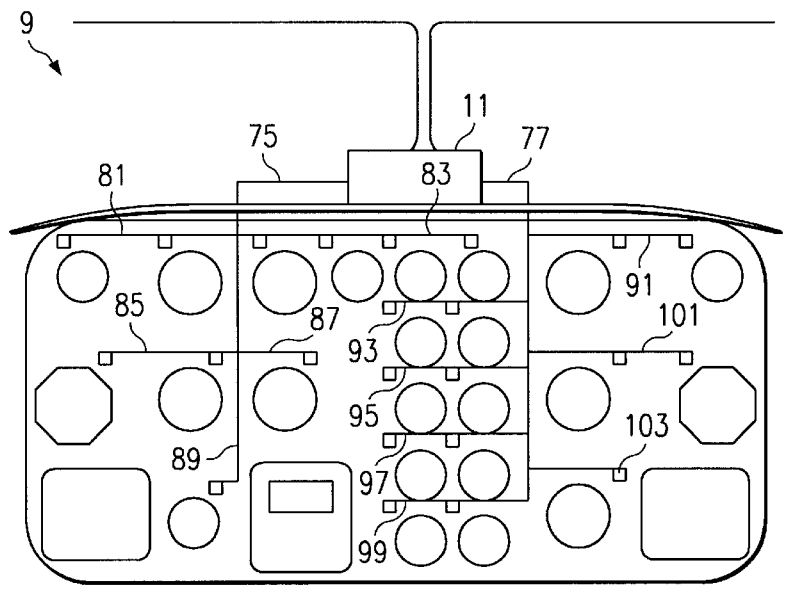
FIG. 3 is a pictorial representation of the implementation of the lighting system of the present invention in a fixed wing craft.

FIG. 2 is a pictorial representation of the illumination system of the present invention utilized in a rotor wing craft installation, while FIG. 3 is a pictorial representation of the utilization of the illumination system of the present invention in a fixed wing craft installation.

With reference now to FIG. 2, illumination system 9 includes a power module 11 which has conductors 15, 17, extending therefrom. Each conductor separates into subconductors. For example, conductor 15 is made up of subconductors 21, 23, 25, and 27. Likewise, conductor 17 is made up of subconductors 29, 31, 33. The subconductors extend from the main conductors 15, 17. A number of light emitting diodes are energized by current pathways which extend between conductors 15, 17 and subconductors 21, 23, 25, 27, 29, 31, and 33. For example, light emitting diodes 35, 37, 39 are carried by subconductor 27. For subconductor 33, light emitting diodes 41, 43, 45 are provided. In accordance with the illumination system 9 of the present invention, each dial, gage, meter or instrument has its own individual lighting which is provided by a light emitting diode which is dedicated thereto. Each light emitting diode provides a spot light for a particular location on the cockpit. When the cockpit lighting system is "powered-off" 5 the diodes provide the sole source of lighting which is compatible with night vision imaging systems.

In the rotor wing craft installation of FIG. 2, conductor 15 powers nine independent LED lamps. Conductor 17 also powers nine independent LED lamps.

FIG. 3 is a representation of a typical fixed wing craft installation of the lighting system 9 of the present invention. As is shown, conductor 75 extends from power module 11. For this application, conductor 75 includes subconductors 81, 83, 85, 87 and 89 are connected thereto, which support a total of ten independent light emitting diode lamps. Conductor 77 includes subconductors 91, 93, 95, 97, 99, 101, and 103, which support a total of thirteen light emitting diode lamps. It is important to note that the cable assembly are customizable to satisfy industrial cockpit layouts or designs.

Figure 4:
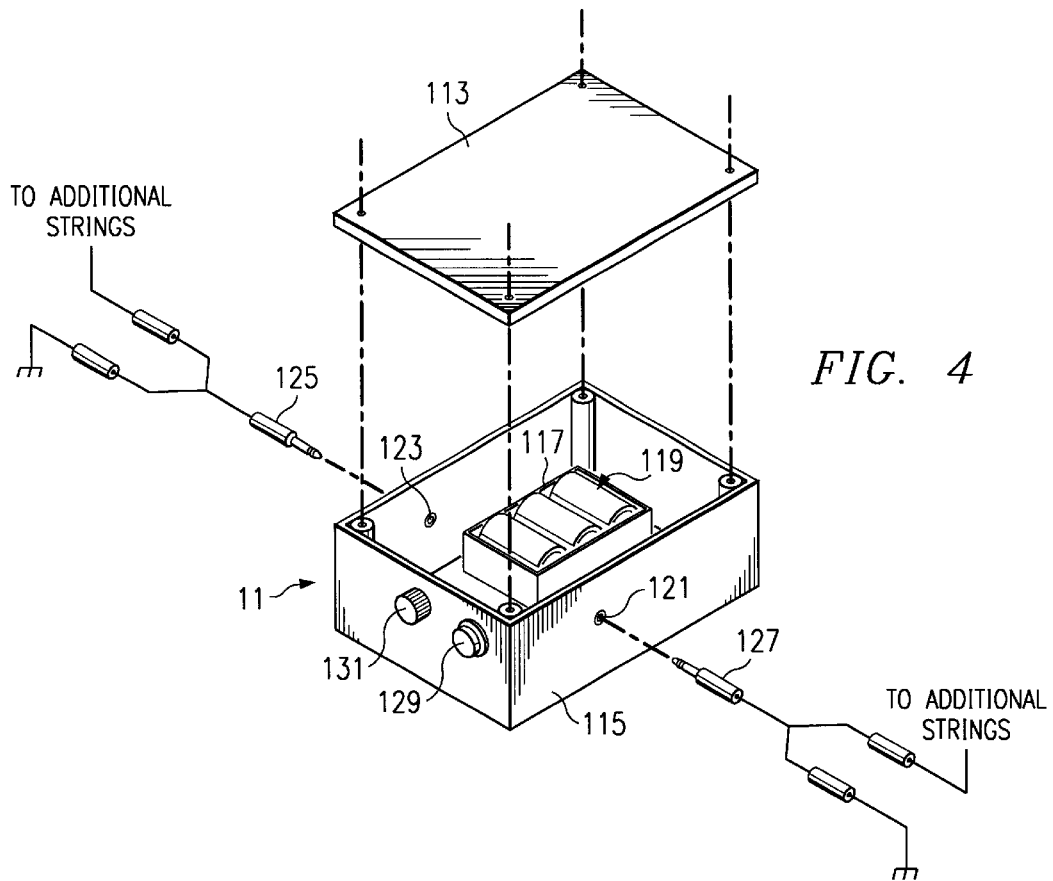
FIG. 4 is a pictorial representation of the components which make up the lighting system of the present invention.

FIG. 4 is a pictorial representation of power module 11. As is shown, a removable top 113 is provided for releasably engaging rectangular housing 115. These components are secured together utilizing thumb/countersink screws (not depicted in this view). Within housing 115 is a battery cradle 117 which is adapted to receive a plurality of batteries. In the preferred embodiment, three "D" size batteries may be utilized. As a secondary power source, "AA" size batteries are utilized. Two female jack connectors 121, 123 are provided to allow electrical connection with electrical jacks 125, 127. An on/off switch 129 is provided which is accessible from the exterior of housing 115. Additionally, a potentiometer indicator 131 is provided which provides a "battery low" signal. Other battery combinations are also compatible to the system. For example, nine volt or lithium batteries could be utilized with or in various other battery combinations.

FIGS. 5A through 5E is a pictorial representation of a bracket 201 which is utilized to secure LED lamp 213 in position relative to an instrument panel in a flight cockpit. A conductor 215 supplies electrical current to LED lamp 213. Bracket 201 secures LED lamp 213 in a particular position relative to a particular instrument to which it is dedicated. As is shown, bracket 201 includes horizontal portion 205, vertical portion 203, and angled portion 207. Horizontal portion 205 is adapted to be flush with the instrument panel itself As is shown in FIG. 5D, a slot 209 is provided which is adapted in size and shape to engage an LED lamp which is utilized in position relative to the instrument panel. Vertical portion 203 extends upward from horizontal portion 205. Angled portion 207 is provided at a particular angle relative to vertical portion 203, but may be reshaped by the pilot, crew, or installation personnel to a particular orientation relative to a particular instrument in the control panel. In other words, a portion 207 is flexible enough to be reshaped to allow light to be directed to a particular location within an instrument panel. FIG. 5B is a cross section view (with dimensions provided) of bracket 201. These are preferred dimensions, and not meant to be limiting of the present invention. Portion 207 is depicted in plan view in FIG. 5C. As is shown, a groove 209 is provided which is adapted in size and shape to receive the LED lamp portion. FIG. 5E is a pictorial representation of the screw in position relative to horizontal portion 205. Bracket 201 is held in position by a screw, just like post lighting systems of the prior art.

Figures 7, 8:
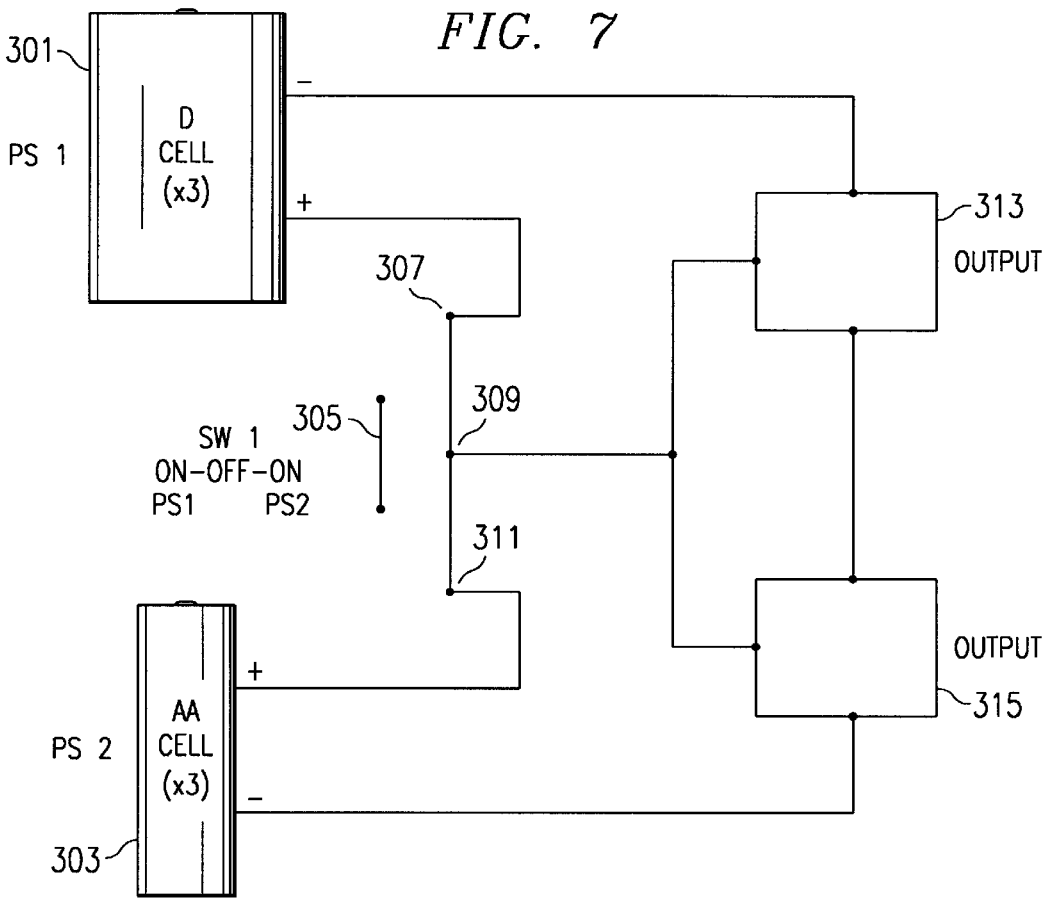
FIG. 7 is an electrical schematic of the preferred power circuit of the present invention.
FIG. 8 is a cross-section view of an LED lamp in accordance with the present invention

FIG. 7 is an electrical schematic which depicts the preferred circuit within the portable housing, all in accordance with the preferred embodiment of the present invention. As is shown, the circuit includes battery pack 301 and battery pack 303. Battery pack 301 is preferably the primary power supply, and it consists of three "D" cell batteries coupled together in an array. Power supply 303 is a back-up, or secondary, power supply, which preferably includes three "AA" batteries also coupled together in an array. Switch SW1 is a three-way switch which is defined by sliding contact 305 and stationary contacts 307, 309, 311. Sliding contact 305 is moved between the three positions. In one position, power supply 301 is in an "on" position. In the middle position, no power supply is on, therefore the circuit is "off." In the other position, power supply 303 is in the "on" position. The power provided by the power supply 301 or power supply 303 is supplied to output jacks 313, 315. As is shown, the output jacks 313, 315 allow for the connection to both the positive and negative terminals of the power supplies, depending upon which is switched in the circuit.

FIG. 8 is a cross section view of an LED lamp utilized in the preferred embodiment of the present invention. As is shown therein, electrical conductors 401, 403 serve to connect LED 409 into the electrical circuit defined by the power supply within the portable housing (all as is depicted in FIG. 7). As is shown, LED 409 is contained within relatively small housing 405. The back end of the housing is sealed with an epoxy light barrier 407. The front end of the housing is covered by epoxy light barrier 411 which transmits the light generated by light emitting diode 409.

Figure 9:
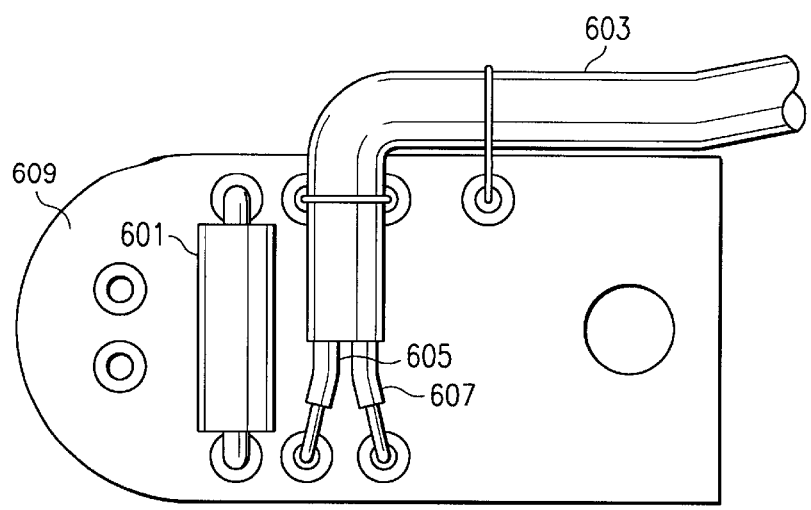
FIG. 9 is a plan view of a circuit board in accordance with the present invention.

FIG. 9 is a plan view of a circuit board onto which the LED 409 and other components are connected. As is shown, circuit board 609 is adapted with a plurality of circuit contacts. As is shown resistor 601 is coupled between two of the contact points. Cable 603 provides an electrical circuit connection to the power supply circuit (of FIG. 7). Conductors 605, 607 are banded together within conductor 603, and are depicted in FIG. 9 as making electrical connection with particular portions of circuit board 609.

Figure 10:
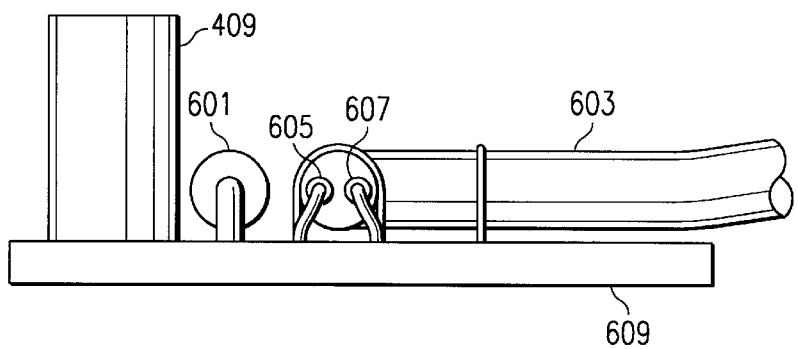
FIG. 10 depicts the preferred circuit board (and components) of the present invention.
Figure 11:
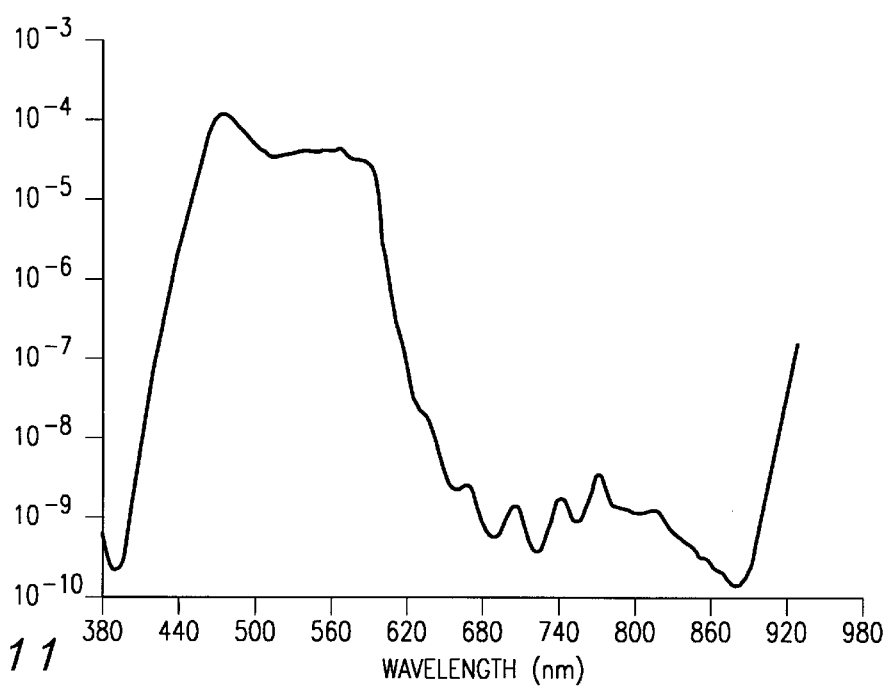
FIG. 11 is a graphical view of the frequency of light generated by the LED lamps utilized in accordance with the present invention.

FIG. 10 is a side view of circuit board 609. As is shown, LED 409 is connected to circuit board 609. In the preferred embodiment of the present invention, LED 409 comprises a model no. 2145-105, a light emitting diode manufactured by Pynco Inc., which preferably provides illumination in the range as defined by FIG. 11.

FIG. 6 is a graphical representation of the relative responses of particular night vision goggles, as well as the typical responsiveness of a human eye. As is shown, the light response for generation II and generation III night vision goggles is depicted graphically. Also, as is shown, the human photopic curve is also depicted graphically. As is shown, there is very little overlap between the photopic curve and generation III night vision imaging systems. Accordingly, in accordance with the preferred embodiment of the present invention, the light emitting diode provides illumination in a range which does not interfere with night vision goggle systems, and thus which can be utilized safely. A comparison of FIGS. 6 and 11 reveals that the LED light sources provide light outside the frequency range of operation of GEN III Night Vision goggles. The white light provided by the LED light sources is a particularly good lighting for human vision, so cockpit vision is not limited or impaired (such as is possible with green light which impairs the perception of colors) when the goggles are not utilized, and there is no interference with the night vision goggles.

What is claimed is:

1. A supplementary lighting system for use in a vehicle during night vision imaging operations to illuminate a plurality of vehicle instruments, comprising:
   a portable housing;
   a battery pack coupled to said portable housing;
   a plurality of electrical cables extending outwardly from said portable housing, defining a plurality of current paths in electrical communication with said battery pack; and
   a plurality of light-emitting circuit elements coupled to said plurality of current paths, each providing a spot light, when energized, having a frequency which does not interfere with said night vision imaging operations, each said plurality of light-emitting circuit elements being adapted to be positioned proximate to one of said plurality of vehicle instruments.

2. The supplementary lighting system of claim 1, further comprising a plurality of mechanical coupling devices adapted to locate said spot light of each of said plurality of light-emitting circuit elements relative to a particular one of said plurality of vehicle instruments.

3. The supplementary lighting system of claim 2, wherein said spot light is visually observable by a human being and is not in the Infrared (IR) spectrum.

4. A supplementary lighting system according to claim 1, further comprising:
   at least one switch accessible from an exterior position on said portable housing for selectively applying power from said battery pack to said plurality of light-emitting circuit elements.

5. A supplementary lighting system according to claim 1, wherein said battery pack comprises:
   a first battery pack located within said portable housing serving as a primary power source; and
   a second battery pack located within said portable housing serving as an auxiliary secondary power source.

6. A supplementary lighting system according to claim 3, wherein said spot light comprises white light.

7. A supplementary lighting system according to claim 1, further comprising:
   a plurality of releasable electrical connectors, accessible from a position exterior of said portable housing, for selectively electrically connecting said plurality of electrical cables to said battery pack.

8. A supplementary lighting system according to claim 1, wherein said plurality of electrical cables define a plurality of closed-loop current paths with said battery pack providing generation of current flow in each of said closed-loop current paths.

9. A supplementary lighting system according to claim 1, wherein said plurality of light emitting circuit elements comprises a plurality of light emitting diodes (LEDs).

10. A supplementary lighting system according to claim 1, wherein said plurality of mechanical coupling devices comprise a plurality of brackets.

11. In combination:
   a plurality of vehicle instruments each having a display;
   a portable housing;
   a battery pack coupled to said portable housing;
   a plurality of electrical cables extending outwardly from said portable housing, defining a plurality of current paths in electrical communication with said battery pack; and
   a plurality of light-emitting circuit elements coupled to said plurality of current paths, each providing a spot light, when energized, having a frequency which does not interfere with said night vision imaging operations each said plurality of light-emitting circuit elements being adapted to be positioned proximate to a particular one of said plurality of vehicle instruments.

12. The supplementary lighting system of claim 11, further comprising a plurality of mechanical coupling devices adapted to locate said spot light of each of said plurality of light-emitting circuit elements relative to a particular one of said plurality of vehicle instruments.

13. The supplementary lighting system of claim 11, wherein said spot light is visually observable by a human being and is not in the Infrared (IR) spectrum.

14. A supplementary lighting system according to claim 11, further comprising:
   at least one switch accessible from an exterior position on said portable housing for selectively applying power from said battery pack to said plurality of light-emitting circuit elements.

15. A supplementary lighting system according to claim 11, wherein said battery pack comprises:
   a first battery pack located within said portable housing serving as a primary power source; and
   a second battery pack located within said portable housing serving as an auxiliary secondary power source.

16. A supplementary lighting system according to claim 11 wherein said spot light comprises white light.

17. A supplementary lighting system according to claim 11, further comprising:
   a plurality of releasable electrical connectors, accessible from a position exterior of said portable housing, for selectively electrically connecting said plurality of electrical cables to said battery pack.

18. A supplementary lighting system according to claim 11, wherein said plurality of electrical cables define a plurality of closed-loop current paths with said battery pack providing generation of current flow in each of said closed-loop current paths.

19. A supplementary lighting system according to claim 11, wherein said plurality of light emitting circuit elements comprises a plurality of light emitting diodes (LEDs).

20. A supplementary lighting system according to claim 11, wherein said plurality of mechanical coupling devices comprise a plurality of brackets.

* * * * *